United States Patent [19]

Shiraishi et al.

[11] Patent Number: 4,786,092
[45] Date of Patent: Nov. 22, 1988

[54] DEVICE FOR LOCKING DETACHABLE ROOF IN MOTOR VEHICLE

[75] Inventors: Daiichi Shiraishi, Seto; Shingo Satoh, Sagamihara, both of Japan

[73] Assignee: Toyota Jidosha Kabushiki Kaisha, Japan

[21] Appl. No.: 27,948

[22] Filed: Mar. 19, 1987

[30] Foreign Application Priority Data

Mar. 20, 1986 [JP] Japan .................................. 61-63555

[51] Int. Cl.⁴ ............................................... E05C 9/04
[52] U.S. Cl. .............................. 292/36; 292/DIG. 5; 296/224
[58] Field of Search ................ 296/224, 137 B; 292/7, 292/36, 39, DIG. 5

[56] References Cited

U.S. PATENT DOCUMENTS

| 859,531 | 7/1907 | Strauss | 292/39 |
| 4,193,618 | 3/1980 | Lee et al. | 292/39 X |
| 4,195,866 | 4/1980 | Tundo et al. | 292/DIG. 5 X |
| 4,540,215 | 9/1985 | Swearingen | 292/36 X |

FOREIGN PATENT DOCUMENTS 60-68157 5/1985 Japan .

Primary Examiner—Richard E. Moore
Attorney, Agent, or Firm—Parkhurst, Oliff & Berridge

[57] ABSTRACT

A device for locking a detachable roof in a motor vehicle to a vehicle body. The lock device has first and second lock pins which are caused to appear and disappear in synchronism with each other in directions opposite to each other by means of a control lever through a first lever, a second lever and connecting mechanisms. These lock pins are inserted into lock holes formed on the vehicle body sides, whereby the roof is fixed to the vehicle body. The turning paths of the connecting mechanisms are shifted in position in the directions of rotary axes of the first and the second levers.

16 Claims, 6 Drawing Sheets

DEVICE FOR LOCKING DETACHABLE ROOF IN MOTOR VEHICLE

BACKGROUND OF THE INVENTION

1. Field of the Invention

This invention relates to improvements in a device for locking a detachable roof when the roof located upwardly of a driver's seat and a passenger's seat in a motor vehicle is made detachable.

2. Description of the Prior Art

Recently, there has been commercialized a motor vehicle having a so-called T-bar roof.

A detachable roof in the motor vehicle of the type described is constructed such that, in the detached state of the detachable roofs, openings contiguous to door openings of side doors positioned outside the driver's seat and the passenger's seat are formed to accommodate the roofs.

Furthermore, in a state where the detachable roof is mounted to a motor vehicle body, the vehicle body is formed with a roof surface flush with a roof body.

In the state where the detachable roof is mounted to the motor vehicle body, a locked state should be reliably maintained so that the detachable roof does not generate vibrations during running of the motor vehicle.

Examples of devices for locking a detachable roof in a motor vehicles for the above-described purpose are disclosed, for example, in U.S. Pat. No. 4,193,618, and Japanese Utility Model Laid-Open No. 68,157/1985.

Each of the lock devices disclosed in these examples include:

first and second levers rotatably mounted to the detachable roof and being in mesh with each other in a manner to be rotatable in synchronism with each other in directions opposite to each other;

first and second lock pins axially, linearly, movably supported on the detachable roof by means of guides at positions opposite to each other with the first and the second levers interposed therebetween, connected to the first and the second levers, respectively, through connecting mechanisms, and insertable at the forward ends thereof into lock holes formed in a motor vehicle body and opposed to the lock pins; and a control lever connected to one of the first and the second levers to rotate the same.

In order to reliably maintain the locked state of the detachable roof, it is necessary to provide sufficient lengths of the lock pins inserted into the lock holes.

As a consequence, such problems are presented that, to extend the strokes of the lock pins, radii of rotations of the first and the second levers, which include gears, are increased, so that the device as a whole becomes large-sized, thus resulting in increased weight of the detachable roof and increased manufacturing cost.

SUMMARY OF THE INVENTION

The present invention has been developed to obviate the above-described disadvantages of the prior art and has as its object the provision of a device for locking a detachable roof in a motor vehicle, wherein sufficient strokes of the lock pins can be provided without increasing the radii of rotation of a pair of levers, i.e., without enlarging the pair of levers and not increasing the weight of the device.

To achieve the above-described object, the present invention contemplates a device for locking a detachable roof in a motor vehicle, including:

first and second levers rotatably mounted to the detachable roof and being in contact with each other in a manner to be rotatable in synchronism with each other in directions opposite to each other;

first and a second lock pins axially, linearly, movably supported on the detachable roof by means of guides at positions opposite to each other with the first and the second levers interposed therebetween, connected to the first and the second levers, respectively, through connecting mechanisms, and insertable at the forward ends thereof into lock holes formed in a motor vehicle body and opposed to the lock pins; and a control lever connected to one of the first and the second levers to rotate the same;

wherein the first and the second levers are arranged such that the turning paths of connecting portions of the connecting mechanisms are spaced from each other in directions of the rotary axes of the levers.

Further, to achieve the above-described object, the present invention contemplates that, in a state where the first and the second lock pins are drawn out of the lock holes, the first and the second levers are arranged in a manner to be at least partially overlapped with each other in the directions of the rotary axes of the levers.

Still further, to achieve the above-described object, the present invention contemplates that the first and the second levers are supported on a base plate substantially perpendicular to the rotary axes thereof such that one of the levers is located on the front surface of the base plate and the other is located on the rear surface thereof.

Still further, to achieve the above-described object, the present invention contemplates that the first and the second levers have contact planes at positions close to the respective rotary axes, wherein one of the levers is provided at the same position as the contact plane in an axial direction of the rotary axis thereof and the other is shifted in position from the contact plane.

Yet further, to achieve the above-described object, the present invention contemplates that the connecting mechanisms include first and second links for converting rotary motion of the first and the second levers into reciprocatory motion and transmitting the same to the first and second lock pins, each of the first and second links being pin-connected at one end thereof to the proximal end of the associated lock pin and at the other end thereof to the lever opposed thereto.

According to the present invention, the first and the second levers for driving the pair of lock pins are shifted in position from each other in the directions of the rotary axes thereof, and, during unlocking, i.e., when the lock pins are drawn out of the lock holes, both levers do not interfere with each other. As a result, a maximum stroke of substantially twice the length of the lever can be given to the lock pin, respectively.

As a consequence, sufficient strokes of the lock pins can be obtained without increasing the levers in size to increase the radii of rotation of the levers.

DETAILED DESCRIPTION OF THE PREFERRED EMBODIMENT

Description will hereunder be given of the embodiment of the present invention with reference to the drawings.

Figure 1:
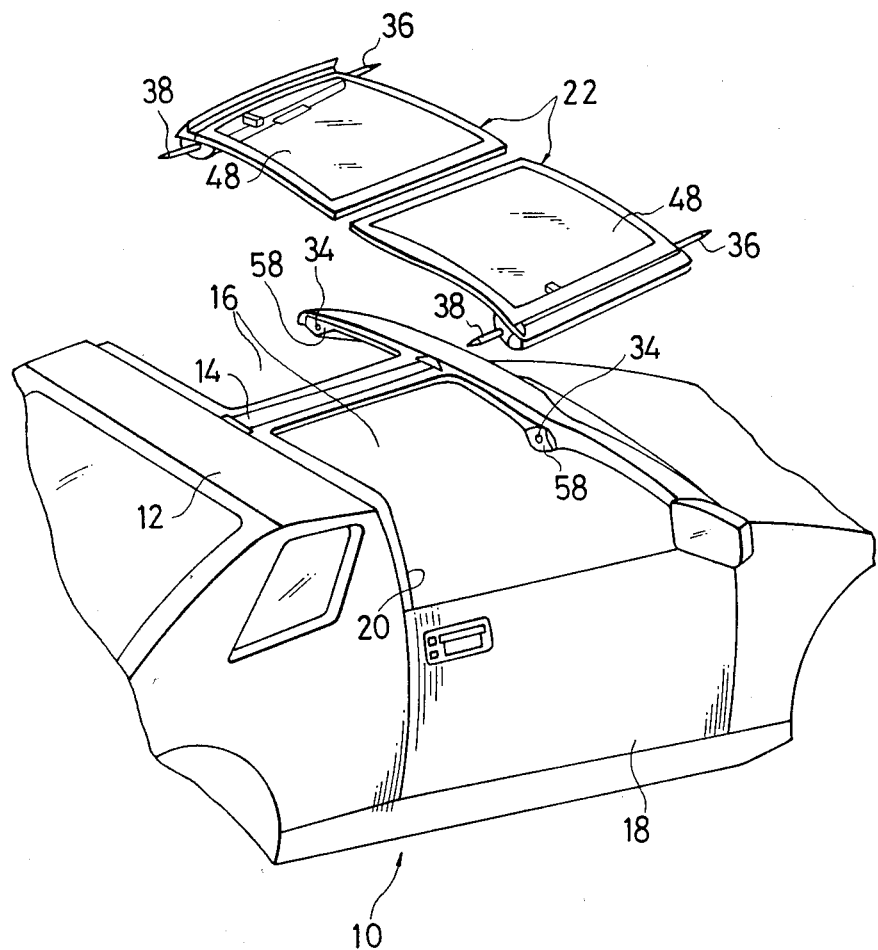
FIG. 1 is a disassembled perspective view showing the detachable roof in a motor vehicle, to which the lock device according to the present invention is applied, and the proximity of the roof in the motor vehicle.

As shown in FIG. 1, a roof 12 in a motor vehicle 10 is formed with a pair of right and left roof openings 16 located at positions on the opposite sides of a center bar 14, the center bar 14 interposed therebetween, at positions above a driver's seat and passenger's seat.

Each of the roof openings 16 are contiguous to a door opening 20 for a side door 18.

A pair of right and left detachable roofs 22 according to the present invention are accommodated in the roof openings 16 in a manner to close the pair of openings 16. A lock device 24 for fixing the detachable roof 22 to the motor vehicle 10 with the roof opening 16 being closed includes: a first lever 26 and a second lever 28 rotatably mounted to the detachable roof 22 and being mesh with each other by means of gears 26A and 28A thereof in a manner to be rotatable in synchronism with each other in directions opposite to each other; first and second lock pins 36 and 38 axially, linearly, movably supported on the detachable roof 22 by means of guides 30 at positions opposite each other in the longitudinal directions of a vehicle body, connected to the first and the second levers 26 and 28 interposed therebetween, respectively, through connecting mechanisms 32, and insertable at the forward ends thereof into lock holes 34 formed in the roof 12 opposed to the lock pins 36 and 38; and a control lever 40 connected to the first lever 26 to rotate the same; the first and the second levers 26 and 28 being arranged such that the turning paths of pins 42 and 44 of the connecting mechanisms 32 for connecting the first and the second lock pins 36 and 38 to the first and the second levers 26 and 28 are shifted in position from each other in directions of rotary axes of the first and the second levers 26 and 28.

Figure 2:
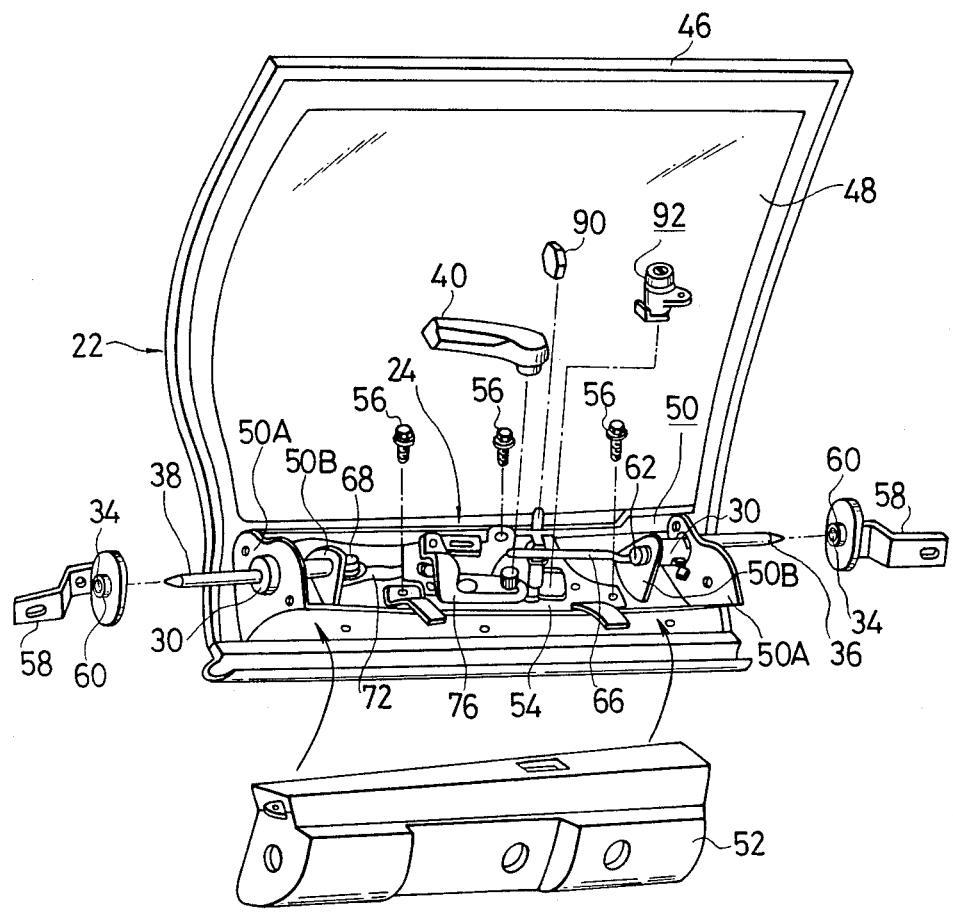
FIG. 2 is a disassembled perspective view showing the detachable roof provided with the lock device according to the present invention.

Designated at 48 in FIGS. 1 and 2 is a glass pane constituting a main part of the detachable roof 22; at 50, a lock base secured to the undersurface of an outer end portion of the glass pane 48 in the widthwise direction of the vehicle body; at 52, a garnish for shielding the outer surface of the lock base 50; and at 46, a molding for protecting a tail end portion of the glass pane 48.

As shown in FIG. 2, a portion of the lock device 24 excluding the guides 30 is secured to a base plate 54, which is locked and fixed to the lock base 50 through three bolts 56.

The guides 30 for guiding the first lock pin 36 and the second back pin 38 are secured to the lock base 50.

Furthermore, the lock holes 34 are each formed in a guide bush 60 inserted into a bracket 58. As shown in FIG. 1, the brackets 58 are secured to outer side positions in the widthwise directions of the vehicle body of the front end face and the rear end face, not shown, of the roof openings 16 in the roof 12.

Figure 3:
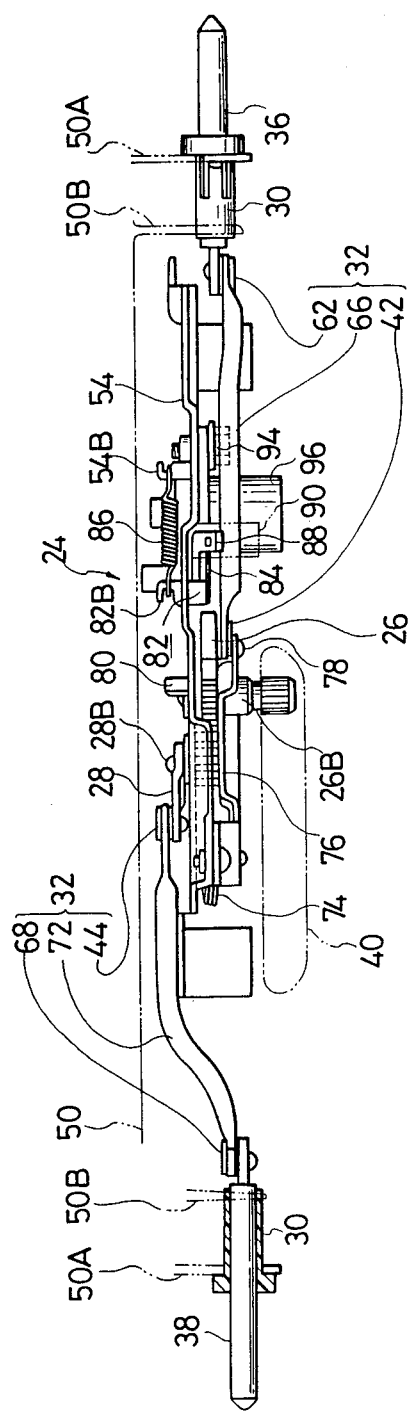
FIG. 3 is a front view showing an embodiment of the lock device according to the present invention.

The base plate 54 is spaced apart from the bottom face of the lock base 50 (Refer to FIG. 3).

The first lever 26 is disposed on the front surface of the base plate 54, i.e., on the side of the garnish 52. The second lever 28 is disposed on the rear surface of the plate 54, i.e., in a space formed between the bottom face of the lock base 50 and the base plate 54.

The base plate 54, the first lever 26 and the second lever 28 are in parallel to one another.

As a consequence, a rotary shaft 26B of the first lever 26 and a rotary shaft 28B of the second lever 28 perpendicularly intersect the base plate 54, and are in parallel to each other.

Here, the gear 28A of the second lever 28 is formed on a portion of the rotary shaft 28B, protruding from the base plate 54 to the outer side.

More specifically, the main body of the second lever 28 and the gear 28A are arranged on the rear surface and the front surface of the base plate 54, respectively, interposing the base plate 54 therebetween and being shifted in position from each other in the axial direction of the rotary shafts 26B and 28B.

The gear 26A of the first lever 26 is formed integrally with the main body of the first lever 26 on the front surface of the base plate 54.

The connecting mechanisms 32 include: a first link 66 connected at one end thereof to the proximal end of the first lock pin 36 through a pin 62 and at the other end thereof to the first lever 26 through the pin 42; and the second link 72 connected at one end thereof to the proximal end of the second lock pin 38 through a pin 68 and at the other end thereof to the second lever 28 through the pin 44. The first link 66 and the second link 72 convert the rotary motions of the first and the second levers 26 and 28 into the reciprocatory motions and transmit the same to the first and the second lock pins 36 and 38, respectively.

Here, as shown in FIG. 3, the first lock pin 36 and the second lock pin 38 are disposed generally in parallel to and substantially on the same axial line as the base plate 54, the first lever 26 and the second lever 28.

Furthermore, the first link 66, and the pins 42 and 62 provided at opposite ends thereof are arranged substantially in the same plane as the first lock pin 36 and the second lock pin 38.

In contrast thereto, the second link 72 is curved upwardly in FIG. 3 from the pin 68 on the side of the second lock pin 38, extending to the rear side of the base plate 54 and is connected to the second lever 28 through the pin 44.

Figure 4:
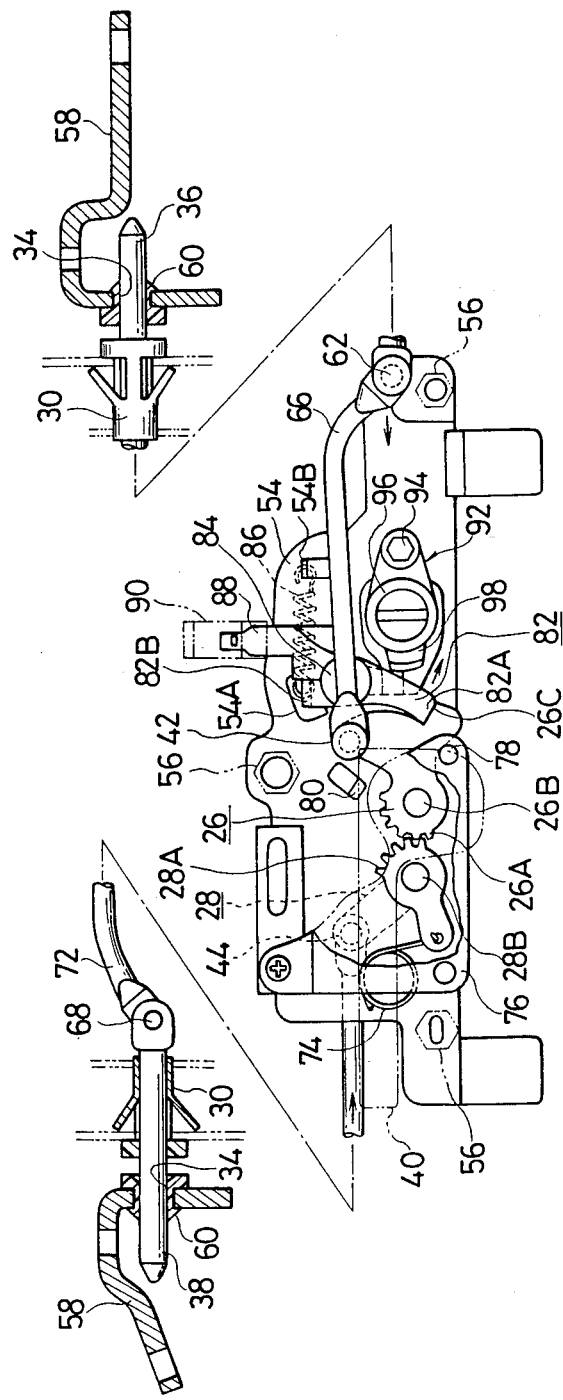
FIG. 4 is a plan view showing the above embodiment as seen from an automobile passenger compartment.

Designated at 74 in FIGS. 3 and 4 is a snap action spring confined between the base plate 54 and the second lever 28, for biasing the second lever 28 in the projecting and retracting directions of the lock pin. Denoted at 76 is a sub-base secured to the base plate 54 in a manner to rotatably support the ends of one side of the rotary shafts 26B and 28B of the first and the second levers 26 and 28 and to shield the gears 26A and 28A from the front side.

The first lever 26, when rotated in the clockwise direction in FIG. 4, drives the first lock pin 36 in the projecting direction thereof through the first link 66, and, when rotated in the counterclockwise direction, drives the first lock pin 36 in the retracting direction thereof.

Furthermore, the second lever 28 is adapted to drive the second lock pin 38 in a direction reverse to the first lever 26.

Provided on the base plate 54 are first and second stoppers 78 and 80 for controlling rotations of the first and the second levers 26 and 28 in the projecting and the retracting directions thereof.

The first stopper 78 comprises one of a plurality of pins for supporting the sub-base 76.

Furthermore, the second stopper 80 is formed by cutting and bending (shaving) a portion of the base plate 54 toward the rear side thereof.

As shown in FIG. 4, the first lever 26 abuts against the first stopper 78 in the clockwise direction, and the second lever 28 abuts against the second stopper 80 in the clockwise direction.

Designated at 82 in FIG. 4 is a pawl supported by a shaft 84 in a manner to rock about the shaft 84 on the front surface of the base plate 54.

The forward end 82A of the pawl 82 may take either one of two positions including a position where it engages an engageable recess 26C formed in the first lever 26 to preclude rotation of the first lever 26 in the counterclockwise direction when the first lever 26 rotates in the clockwise direction to abut against the first stopper 78 and a position where it is disengaged from the engageable recess 26C to permit rotation of the first lever 26 in the counterclockwise direction.

The other end 82B of the pawl 82 is bent at right angle in a manner to be projected toward the rear side of the base plate 54 through a hole 54A formed in the base plate 54.

The base plate 54 is formed with a struck out part 54B raised toward the rear side of the base plate 54 at a position spaced apart from the hole 54A in the direction toward the first lock pin 36.

A tension coil spring 86 is provided between the shaving 54B and the other end 82B of the pawl 82, whereby the pawl 82 is biased in the clockwise direction in FIG. 4, i.e., in the direction in which the forward end 82A is engaged with the engageable recess 26C of the first lever 26.

A release lever 88 is coaxially and rotatably supported on the rotary shaft 84 rotatably supporting the pawl 82. This release lever 88 abuts against the other end 82B of the pawl 82 in the counterclockwise direction in FIG. 4, so that the other end 82B can be driven by the release lever against the tensile force of the tension coil spring 86 in the counterclockwise direction. Furthermore, the release lever 88 is adapted to be freely rotatable with the pawl 82 in the clockwise direction in FIG. 4.

Denoted at 90 in FIG. 4 is a control knob secured to the forward end of the release lever 88.

Designated at 92 in FIGS. 3 and 4 is a locking device for holding the lock device in the locked state.

This locking device 92 is constituted by a key cylinder 96 locked and fixed to the base plate 54 by a bolt 94 and a key cylinder lever 98 secured to a key rotor, not shown, of the key cylinder 96. In the locking device 92, when the key cylinder 98 is at a stroke end position in the clockwise direction as shown in FIG. 4, the key cylinder lever 98 abuts against the release lever 88 to prevent the release lever 88 from rotating in the counterclockwise direction, i.e. rotating in a direction to drive the pawl 82 in the counterclockwise direction.

Furthermore, when rotated in the counterclockwise direction in FIG. 4, the key cylinder lever 98 allows the release lever 88 to move in the counterclockwise direction to drive the pawl 82 in the counterclockwise direction, whereby the forward end 82A slips out of the engageable recess 26C of the first lever 26.

As shown in FIGS. 3 and 4, the guides 30 for guiding the first lock pin 36 and the second lock pin 38 in the axial direction are supported on two pairs of ribs 50A formed at opposite end positions in the longitudinal direction of the vehicle and 50B formed at positions slightly inwardly spaced apart from the opposite end positions.

Description will hereunder be given of the action of this embodiment.

The lock device 24 shown in FIGS. 3 and 4 is in the locked state when the detachable roof 22 is mounted to the roof opening 16.

In this state, the first and the second lock pins 36 and 38 are in the positions projecting in the directions of the forward ends, respectively, and inserted in the lock holes 34 on the vehicle body sides, whereby the detachable roof 22 cannot be detached.

In this state, the first lever 26 abuts against the first stopper 78.

Furthermore, the forward end 82A of the pawl 82 is engaged with the engageable recess 26C of the first lever 26, whereby the first lever 26 is prevented from rotating in the counterclockwise direction in FIG. 4, i.e. rotating in the unlocking direction.

This state of the pawl 82 is maintained by the tensile force of the tension coil spring 86.

Furthermore, as shown in FIG. 4, when the locking device 92 is held in the locked state, the key cylinder lever 98 thereof is in the position of abutting against the release lever 88, whereby the release lever 88 is prevented from rotating, so that the forward end 82A of the pawl 82 cannot slip out of the engageable recess 26C of the first lever 26.

Figure 5:
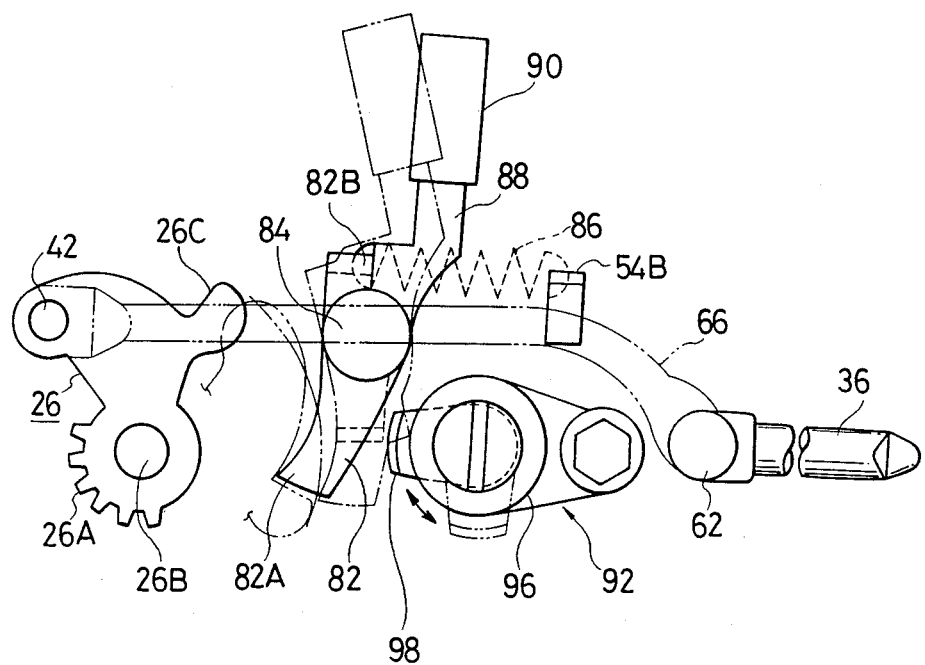
FIG. 5 is a general plan view showing the positional relationship between the first lever, a locking pawl, a release lever and a locking device.
Figure 6:
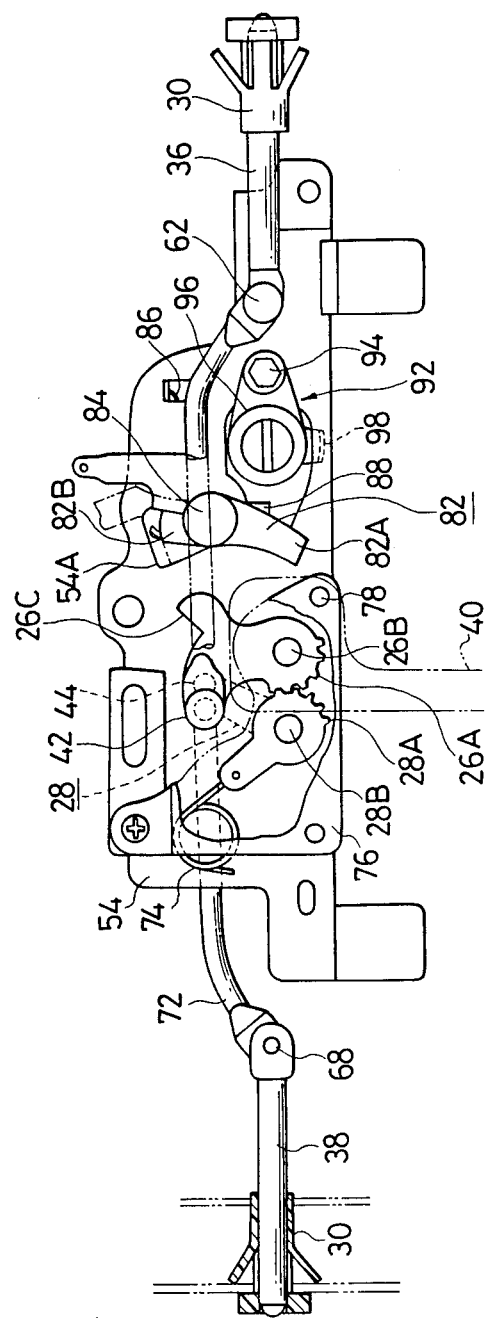
FIG. 6 is a plan view showing the unlocked state in the above embodiment, similar to FIG. 4.

Subsequently, when a key, not shown, is inserted into the key cylinder 96 and driven in the unlocking direction, the release lever 88 can rotate in the lock releasing direction, i.e., the counterclockwise direction in the drawings as shown in FIGS. 5 and 6.

Therefore, turning of the knob 90 by an occupant of the motor vehicle in the counterclockwise direction causes the release lever 88 to drive the pawl 82 in the counterclockwise direction, whereby the forward end 82A is disengaged from the engageable recess 26C of the first lever 26.

Subsequently, when the control lever 40 is rotated from a position shown in FIG. 4 through about 90° in the counterclockwise direction, the first lever 26 connected thereto is similarly rotated through about 90° in the counterclockwise direction.

Simultaneously, the second lever 28 operationally associated with the first lever 26 via the gears 26A and 28A rotates through about 90° in the clockwise direction.

Turning motions of the first lever 26 and the second lever 28 are converted by the first link 66, the pins 62 and 42, and the second link 72, and the pins 68 and 44 as the connecting mechanisms 32, into motion retracting the first lock pin 36 and the second lock pin 38, respectively. These retracting motions are transmitted to the first and the second lock pins 36 and 38. Accordingly, the first and the second lock pins 36 and 38 are brought into retracted states as shown in FIG. 6 and a major portion of these lock pins are retracted inwardly of the guides 30.

As a consequence, the first lock pin 36 and the second lock pin 38 are disengaged from the lock holes 34 formed in the vehicle body sides, so that the detachable roof 22 can be removed from the roof 12.

At this time, as shown in the planar view of FIG. 6, the first lever 26 and the second lever 28 are overlapped with each other in the thicknesswise direction of the levers. However, the first and the second levers 26 and 28 are shifted in position from each other as described above, so that these levers do not interfere with each other.

Therefore, sufficient strokes of the pins 42 and 44 can be taken, whereby reciprocatory strokes of the first and the second lock pins 36 and 38 can be extended. Thus, the lengths of the lock pins 36 and 38 inserted into the lock holes 34 can be extended.

Additionally, after the first and the second levers 26 and 28 are rotated through a predetermined angle in the unlocking direction, even if the release lever 88 biased by spring 86 is released lays to a free condition, the forward end 82A of the pawl 82 merely idle away from the first lever 26, so that the forward end 82A does not interfere with the rotations of the first and the second levers 26 and 28.

Furthermore, when the first and the second lock pins 36 and 38 are projected from the unlocked states as shown in FIG. 6 to be engaged with the lock holes 34, the control lever 40 is rotated in a direction reverse to the above.

At this time, the first lever 26 interferes with the forward end 82A of the pawl 82, however, if the pawl 82 is pushed against the tensile force of the tension coil spring 86 in the counterclockwise direction in FIG. 6, then the first lever 26 returns together with the second lever 28 to the locked states as shown in FIG. 4.

Additionally, in the above embodiment, the first lever 26 and the second lever 28 are operationally associated with each other through the meshing engagement of the gears 26A and 28A. However, the present invention need not necessarily be limited to this, and the first and the second levers 26 and 28 may be other types which can rotate in directions opposite to and in synchronism with each other.

For example, both levers may be brought into synchronism by frictional contact and rotated in directions opposite to each other. More specifically, the first lever 26 and the second lever 28 may be in the relationship of contact including sliding contact such as gears and frictional contact such as friction wheels.

Furthermore, in the above embodiment, the connecting mechanism 32 interposed between the lock pin and the lever includes the link and the pins on the opposite ends of the link. However, in short, the connecting mechanisms 32 may be other types which can convert the turning motions of the first and the second levers 26 and 28 into the reciprocatory motions of the first and the second lock pins 36 and 38. As a consequence, the connecting mechanisms 32 may be ones in which the first and the second lock pins 36 and 38 are connected to the first and the second levers 26 and 28 without the links.

Furthermore, the rotary shafts 26B and 28B of the first and the second levers 26 and 28 are disposed in parallel to each other. However, the present invention need not necessarily be limited to this, and an arrangememt may be adopted such that, in short, a portion of the first lever 26 in the proximity of the pin 42 being the connecting point of the connecting mechanism 32 of the first lever 26, and a portion of the second lever 28 in the proximity of the pin 44 of the second lever 28 are shifted in position from each other in a manner not to interfere with each other in the thicknesswise direction of the levers in the unlocked states. In such an arrangement, the two rotary shafts 26B and 28B may support the first and the second levers 26 and 28 such that the rotary planes of the first and the second levers are in a torsional relationship with each other.

What is claimed is:

1. A device for locking a detachable roof in a motor vehicle, comprising:

first and second levers mounted on rotary axes mountable to said detachable roof in contact with each other in a manner to be rotatable in synchronism with each other in directions opposite to each other;

first and second lock pins axially, linearly, movably supportable on said detachable roof by means of guides mountable at positions opposite to each other on said detachable roof with the first and the second levers interposed therebetween, said first and second lock pins being connected to the first and the second levers, respectively, through connecting mechanisms, and insertable at forward ends thereof into lock holes formed in a motor vehicle body and opposed to the lock pins; and a control lever connected to one of the first and second levers to rotate the same, wherein the first and the second levers are arranged such that the turning paths of connecting portions of said connecting mechanisms are spaced from each other in directions of the rotary axes of the first and second levers.

2. The device for locking a detachable roof in a motor vehicle as set forth in claim 1, wherein in a state where the first and the second lock pins are drawn out of the lock holes, said first and said second levers are arranged in a manner to be at least partially overlapped with each other in directions of the rotary axes of said levers.

3. The device for locking a detachable roof in a motor vehicle as set forth in claim 1, wherein said first and second levers are supported on a base plate substantially perpendicular to the rotary axes thereof such that one of said levers is located on a front surface of said base plate and the other is located on a rear surface thereof.

4. The device for locking a detachable roof in a motor vehicle as set forth in claim 2, wherein said first and second levers are supported on a base plate substantially perpendicular to the rotary axes thereof such that one of said levers is located on a front surface of said base plate and the other is located on a rear surface thereof.

5. The device for locking a detachable roof in a motor vehicle as set forth in claim 1, wherein said first and second levers are in rotatable contact with each other in a contact plane, at positions proximate the respective rotary axes, and one of said levers is provided at the same position as the contact plane in an axial direction of the rotary axis thereof and the other is spaced from the contact plane.

6. The device for locking a detachable roof in a motor vehicle as set forth in claim 2, wherein said first and second levers are in rotatable contact with each other in a contact plane, at positions proximate the respective rotary axes, and one of said levers is provided at the same position as the contact plane in an axial direction of the rotary axis thereof and the other is spaced from the contact plane.

7. The device for locking a detachable roof in a motor vehicle as set forth in claim 3, wherein said first and second levers are in rotatable contact with each other in a contact plane, at positions proximate the respective rotary axes, and one of said levers is provided at the same position as the contact plane in an axial direction of the rotary axis thereof and the other is spaced from the contact plane.

8. The device for locking a detachable roof in a motor vehicle as set forth in claim 4, wherein said first and second levers are in rotatable contact with each other in a contact plane, at positions proximate the respective rotary axes, and one of said levers is provided at the same position as the contact plane in an axial direction of the rotary axis thereof and the other is spaced from the contact plane.

9. The device for locking a detachable roof in a motor vehicle as set forth in claim 1, wherein said connecting mechanisms include first and second links for converting rotary motions of said first and second levers into reciprocatory motions and transmitting the same to the first and second lock pins, each of the first and second links being pin-connected at one end thereof to a proximal end of the first and second lock pins respectively and at the other end thereof to the one of said levers opposed thereto.

10. The device for locking a detachable roof in a motor vehicle as set forth in claim 2, wherein said connecting mechanisms include first and second links for converting rotary motions of said first and second levers into reciprocatory motions and tansmitting the same to the first and second lock pins, each of the first and second links being pin-connected at one end thereof to a proximal end of the first and second lock pins respectively and at the other end thereof to the one of said levers opposed thereto.

11. The device for locking a detachable roof in a motor vehicle as set forth in claim 3, wherein said connecting mechanisms include first and second links for converting rotary motions of said first and second levers into reciprocatory motions and transmitting the same to the first and second lock pins, each of the first and second links being pin-connected at one end thereof to a proximal end of the first and second lock pins respectively and at the other end thereof to the one of said levers opposed thereto.

12. The device for locking a detachable roof in a motor vehicle as set forth in claim 4, wherein said connecting mechanisms include first and second links for converting rotary motions of said first and second levers into reciprocatory motions and transmitting the same to the first and second lock pins, each of the first and second links being pin-connected at one end thereof to a proximal end of the first and second lock pins respectively and at the other end thereof to the one of said levers opposed thereto.

13. The device for locking a detachable roof in a motor vehicle as set forth in claim 5, wherein said connecting mechanisms include first and second links for converting rotary motions of said first and second levers into reciprocatory motions and transmitting the same to the first and second lock pins, each of the first and second links being pin-connected at one end thereof to a proximal end of the first and second lock pins respectively and at the other end thereof to the one of said levers opposed thereto.

14. The device for locking a detachable roof in a motor vehicle as set forth in claim 6, wherein said connecting mechanisms include first and second links for converting rotary motions of said first and second levers into reciprocatory motions and transmitting the same to the first and second lock pins, each of the first and second links being pin-connected at one end thereof to a proximal end of the first and second lock pins respectively and at the other end thereof to the one of said levers opposed thereto.

15. The device for locking a detachable roof in a motor vehicle as set forth in claim 7, wherein said connecting mechanisms include first and second links for converting rotary motions of said first and second levers into reciprocatory motions and transmitting the same to the first and second lock pins, each of the first and second links being pin-connected at one end thereof to a proximal end of the first and second lock pins respectively and at the other end thereof to the one of said levers opposed thereto.

16. The device for locking a detachable roof in a motor vehicle as set forth in claim 8, wherein said connecting mechanisms include first and second links for converting rotary motions of said first and second levers into reciprocatory motions and transmitting the same to the first and second lock pins, each of the first and second links being pin-connected at one end thereof to a proximal end of the first and second lock pins respectively and at the other end thereof to the one of said levers opposed thereto.

* * * * *